United States Patent [19]
Ida et al.

[11] Patent Number: 5,766,014
[45] Date of Patent: Jun. 16, 1998

[54] BINARY INFORMATION DISPLAY APPARATUS

[75] Inventors: Takashi Ida; Minoru Takahashi; Jouji Matsumoto, all of Omiya, Japan

[73] Assignee: Mitsubishi Materials Corporation, Tokyo, Japan

[21] Appl. No.: 843,857

[22] Filed: Apr. 17, 1997

[30] Foreign Application Priority Data

May 27, 1996 [JP] Japan ................................. 8-132300

[51] Int. Cl.$^6$ .............................. G09B 21/00; G09F 9/37
[52] U.S. Cl. ........................................... 434/114; 424/112
[58] Field of Search ............................ 434/112, 113, 434/114

[56] References Cited

U.S. PATENT DOCUMENTS

| | | | |
|---|---|---|---|
| 4,871,992 | 10/1989 | Petersen | 434/113 |
| 5,449,292 | 9/1995 | Tani et al. | 434/114 |
| 5,453,012 | 9/1995 | Hudecak | 434/114 |
| 5,466,154 | 11/1995 | Thompson | 434/114 |
| 5,522,728 | 6/1996 | Kaplan | 434/114 |

Primary Examiner—Paul J. Hirsch
Attorney, Agent, or Firm—Armstrong, Westerman, Hattori, McLeland & Naughton

[57] ABSTRACT

A binary information display apparatus displays braille information with high accuracy by means of four braille pins, which are actuated by a stepping motor having a stepping angle of 45° and, hence, eight step positions. The apparatus includes four pins; a triplet cam which acts on ends of three pins out of the four pins so as to independently urge such three pins to selectively project from a display surface of a pin-supporting member and to selectively retract the same behind the display surface; a stepping motor for rotating the triplet cam about an axis thereof; and a fourth cam portion which actuates the remainder of the four pins. The motor can perform consecutive seven steps at 45° intervals, starting from a position where a rotation restricting projection on the fourth cam portion abuts a stopper step surface on the pin-supporting member, without causing rotation of the fourth cam portion. The state of the fourth pin is therefore not changed during such consecutive stepping of the stepping motor over seven steps. With the above-described structural arrangements and resulting operations thereof, it is possible to display eight types of braille information. Similarly, eight types of braille information can be displayed by reversing the motor. Consequently, sixteen types of braille information can be produced by the apparatus of this invention.

3 Claims, 7 Drawing Sheets

1ST STOP POSITION

2ND STOP POSITION

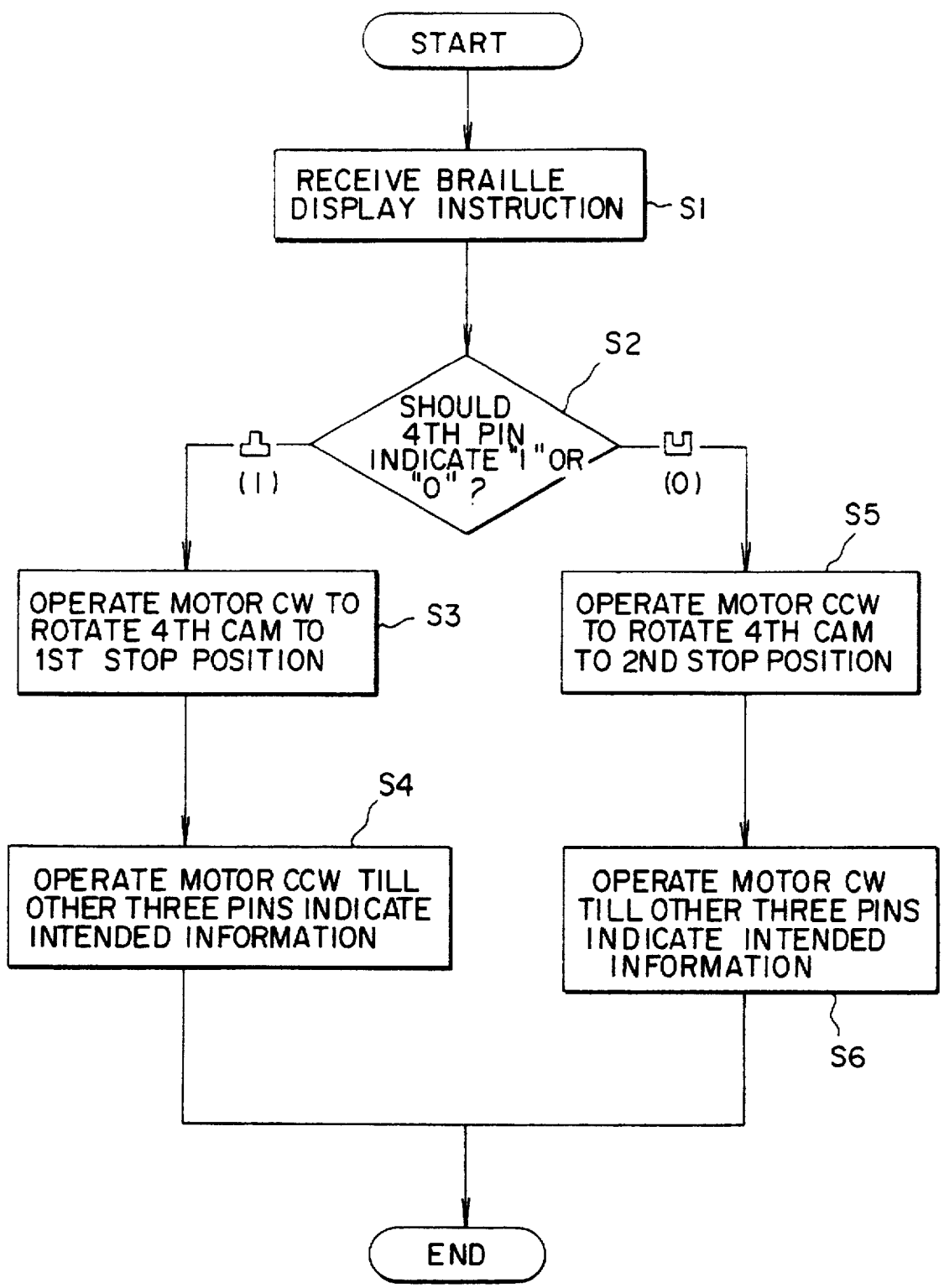

BINARY INFORMATION DISPLAY APPARATUS

BACKGROUND OF THE INVENTION

1. Field of the Invention

The present invention generally relates to a binary information display apparatus, which indicates or displays information expressed in terms of binary codes (such as, braille characters) by means of an array of a plurality of parallel pins which are arrayed at a predetermined spacing and which are independently projected from and retracted behind a display surface. Thus, the apparatus of the present invention is suitable, although not exclusive, for use as a braille display apparatus.

2. Description of the Related Art

A typical example of this type of binary information apparatus is a braille display apparatus, which is disclosed in Japanese Unexamined Patent Publication No. 7-36376. Such conventional apparatus has a simple construction relying upon electrical pin-movement control, while reducing electrical power consumption.

More specifically, as shown in FIG. 6, such conventional apparatus has plurality of arrays of parallel pins 32, each array having three braille pins each corresponding to a raised point of a braille. Such pins 32 are slidably received in through-bores 34 formed in a tabular supporting member 33, such that they are independently slidable in the direction of their axes. A cylindrical cam 35 having an axis perpendicular to the axes of the pins 32 is arranged so as to be engageable with one end of each of the pins 32. The structural arrangement is such that the pins 32 are selectively projected from and retracted behind a surface of the supporting member, as the above-mentioned ends of the pins 32 follow concave portion 35a and convex portion 35b of the surface of the cam 35, in accordance with the rotation of the cam 35 about its axis.

In such braille display apparatus 31, the cam 35 is driven by a stepping motor 36 directly connected thereto. In this manner, different phases or steps of rotation of the stepping motor 36 provide different patterns of combination of the concave and convex portions of the cam 35 along the array of the pins, whereby different patterns of projection of the pins 32 are obtained so as to display various types of braille characters.

Thus, the typical character display (touch-feel display), for those who have sight handicaps, incorporates (as means for selectively and independently actuating the pins 32 up and down) the stepping motor 36 and the pin actuating cam 35 connected to the shaft of the motor 36. The single stepping motor 36 actuates three pins 32, and eight ($2^3=8$) patterns of a combination of the states of the pins 32 are available. The stepping motor 36 operates at a 45° step interval so that there are eight step positions in one full rotation of the motor shaft. For allocating one pattern of the states of braille pins to each of the eight steps of motor operation, it is therefore possible to obtain eight types of pin patterns in one rotation of the motor shaft. Actually, a pair of units are used in combination side by side, each unit including the above-described elements so that six pins are used to selectively project and retract; thereby, representing different characters.

However, the state-of-art braille display apparatus usually employs an eight-point braille display in which each character is represented by a peculiar pattern of a combination of eight braille points. The eight-point braille representation can be realized by using the above-described typical braille display apparatus provided that each motor selectively actuates four braille pins up and down, since such a structural arrangement provides sixteen ($2^4=16$) different patterns of a combination of the states of the braille pins. Thus, the eight-point braille display is possible in a structural arrangement whereby the stepping motor operates at a step interval of 22.5° so that there are sixteen step positions in one full rotation of the motor shaft.

It is to be noted, however, that the eight-point braille representation by the known apparatus with four braille pins encounters the following problem.

The cam contour such that concave and convex portions appear for each pin at 22.5° interval so that the contour of the whole cam is complicated and, at the same time, the gradient of the slope of the cam surface is inevitably increased. Consequently, each braille pin is required to slide along a steep slope of the cam surface, which increases the resistance load imposed on the cam and, hence, on the stepping motor. Consequently, the risk for the stepping motor getting out of the phase is increased; thereby, resulting in a deterioration in the accuracy of the braille display.

Another problem is that since the diameter of each pin has to be reduced, the mechanical strength of the pin against the user's finger getting in touch with the pin is correspondingly reduced; thereby, resulting in deterioration of the reliability of the braille display apparatus as a commercial product.

There has, however, been proposed (although not shown in the drawings) a braille display apparatus in which, in place of the above-mentioned stepping motor, an actuator is used which is made up of bimorph-type piezoelectric elements which act on the lower ends of the respective pins. This type of braille display apparatus is free from the above-mentioned problem encountered by the apparatus employing a stepping motor and, at the same time, the dimensions in the direction perpendicular to the array of the pins is reduced to some extent.

However, driving an actuator having bimorph piezoelectric elements generally require a high voltage. In other words, it is necessary to employ a high-voltage generating circuit besides the main part of the braille display apparatus. It is therefore difficult to reduce the size and the weight of the whole apparatus. Another problem is that, for the same reason as discussed above, it is impossible to comply with the demand for easily transporting such conventional apparatus.

SUMMARY OF THE INVENTION

Accordingly, an object of the present invention is to provide a small-sized and simple binary information display apparatus, which offers a high degree of accuracy of braille information display and which is free from the problem concerning the mechanical strength of the pins.

As such, according to the present invention, there is provided a binary information display apparatus, comprising: an array of a plurality of pins which are arrayed at a constant pitch in parallel with one another; a supporting member for supporting the pins such that the pins are independently and linearly movable along their axes; a first rotary cam engaging with ends of the pins of a group exclusive of an end pin which is at an end of the array so as to axially urge the pins of the group such that the pins are independently actuated by the first rotary cam with the result that the other ends of the independent pins of the group selectively emerge from a display surface of the supporting member; a motor for supporting the first rotary cam so as to rotate the first cam around its axis; a second rotary cam for actuating the end pin, the second rotary cam being rotatably mounted to oppose to the first rotary cam; a driving engaging portion provided on a side surface of the first rotary cam opposing to the second rotary cam; a driven engaging portion provided on one side surface of the second rotary cam so as to be engaged by the driving engaging portion in accordance with the rotation of the first rotary cam; thereby, rotating the second rotary cam; and a rotation restricting projection provided on the other side surface of the second rotary cam, the rotation restricting projection being engageable with a stopper portion of the supporting member so as to hold the second rotary cam at a first stop position or at a second stop position; wherein the cam contour of the second rotary cam is such that the end pin projects from the display surface when the second rotary cam has been rotated to one of the stop positions as a result of the rotation of the shaft of the motor in one direction, and that the end pin is retracted from the display surface when the second rotary cam has been rotated to the other stop position as a result of the rotation of the shaft of the motor in the other direction.

The plurality of pins may include four pins, and the motor may be designed to hold the first rotary cam at one of eight step positions which are arranged at 45° intervals.

The motor may be a stepping motor.

When four pins are employed and a stepping motor is used as the actuator, the rotary motion of the motor shaft causes rotation of the first cam which is a triplet cam.

The triplet cam has a specific cam contour composed of concave and convex portions arranged in a specific pattern, so that rotation of the triplet cam urges associated ends of the braille pins so as to cause independent axial displacements of the pins. Consequently, the ends of the pins supported by the supporting member are selectively projected from and retracted behind the display surface, whereby three-bit binary information is available on the display surface.

When a fourth cam portion (i.e., the second rotary cam) is at one of the first and second stop positions, the stepping motor can perform seven steps at 45° intervals without causing rotation of the fourth cam portion (second rotary cam). Such is the case if the direction of rotation of the stepping motor shaft does not restrict the rotation of the fourth cam portion because the engaging portions on the first and second rotary cams do not engage with each other. Consequently, no change is caused in the status of the end pin (fourth pin) so that the fourth pin is kept in, for example, a projected position. It is thus possible to realize four patterns of a combination of the pin status, with the fourth pin held in the projected state, out of the sixteen patterns which are obtainable with the four pins.

Similarly, when the fourth cam portion (i.e., the second rotary cam) is at the other of the stop positions, the stepping motor can perform seven steps at 45° intervals without causing rotation of the fourth cam portion (second rotary cam) if the direction of rotation of the stepping motor shaft such that it does not restrict the rotation of the fourth cam portion because the engaging portions on the first and second rotary cams do not engage with each other. Consequently, no change is caused in the status of the end pin (fourth pin) so that the fourth pin is kept in, for example, a retracted position. It is thus possible to realize another eight patterns of a combination of the pin status, with the fourth pin in the retracted state, out of the sixteen patterns which are obtainable with the four pins.

It is thus possible to represent sixteen different patterns of a combination of the status of the four pins (i.e., to display four-bit information) by a stepwise 45° incremental rotation of the shaft of the stepping motor.

Initialization of the stepping motor can be effected by causing, when the fourth cam is at one of the stop positions, the stepping motor to perform several steps in the direction in which the fourth cam is stopped. That is, the stepping of the motor in such a direction also causes the shaft of the stepping motor to be forcibly stopped because the driving engaging portion on the triplet cam connected to the motor shaft engages with the driven engaging portion on the fourth cam portion so as to be stopped by the latter. When the driving pulses of voltage are consecutively applied to the stepping motor in this state, the motor which is restrained from rotating is naturally brought out of the phase, so that the original relationship between the cam positions and the phase of the stepping motor is recovered, whereby the apparatus is reset to the initial condition.

These and other features and advantages of the present invention will become clear from the following description of the preferred embodiments when the same is read in conjunction with the accompanying drawings.

BRIEF DESCRIPTION OF THE DRAWINGS

FIG. 5 is a flow chart showing the flow of control of a stepping motor; and

DETAILED DESCRIPTION OF THE PREFERRED EMBODIMENT

An embodiment of the present invention will be described in reference to the accompanying drawings.

Figure 1:
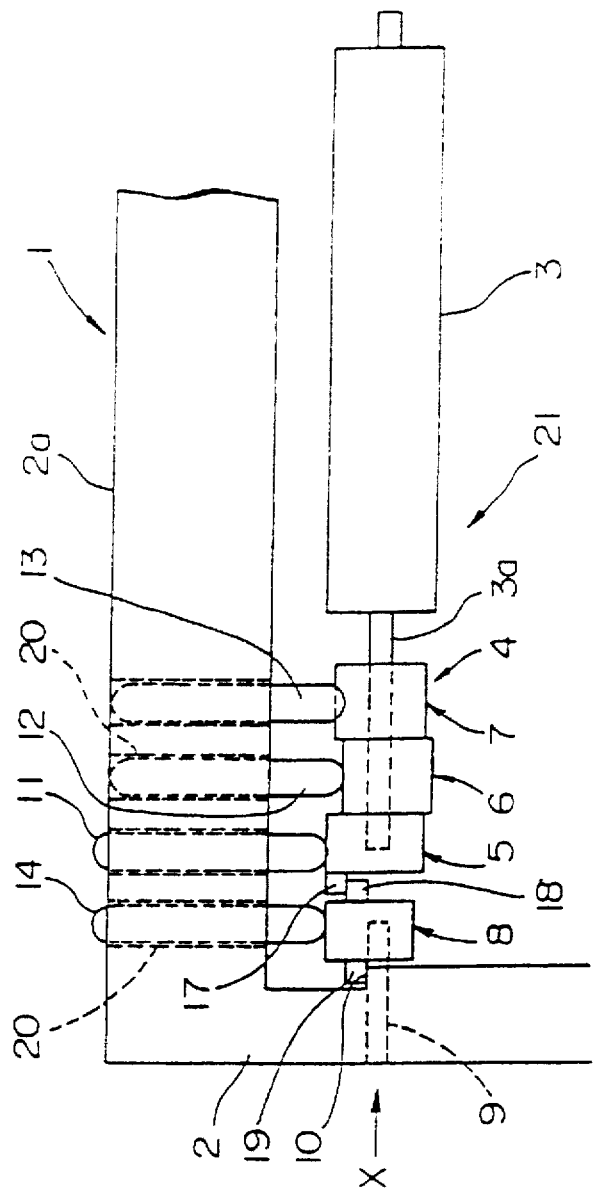
FIG. 1 is a longitudinal sectional view of an embodiment of the binary information display apparatus of the present invention.

FIG. 1 is a longitudinal sectional view of an embodiment of the binary information display apparatus of the present invention. FIGS. 2(a), 2(b), 2(c) and 2(d) are illustrations of cam portions 8, 5, 6, 7 as viewed in the direction of an arrow X in FIG. 1; and FIG. 3 is a schematic perspective view of a braille display apparatus incorporating the binary information display apparatus shown in FIG. 1. FIGS. 4(a) to 4(i) are representations illustrative of the positional relationship between the first cam portion and the fourth cam portion.

Figure 2:
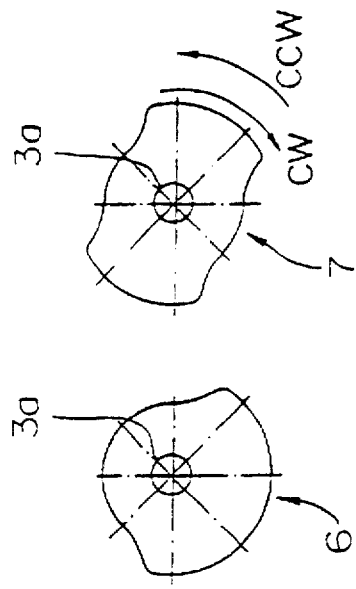
FIGS. 2(a), 2(b), 2(c) and 2(d) are illustrations of cam portions as viewed in the direction of an arrow X in FIG. 1.
Figure 3:
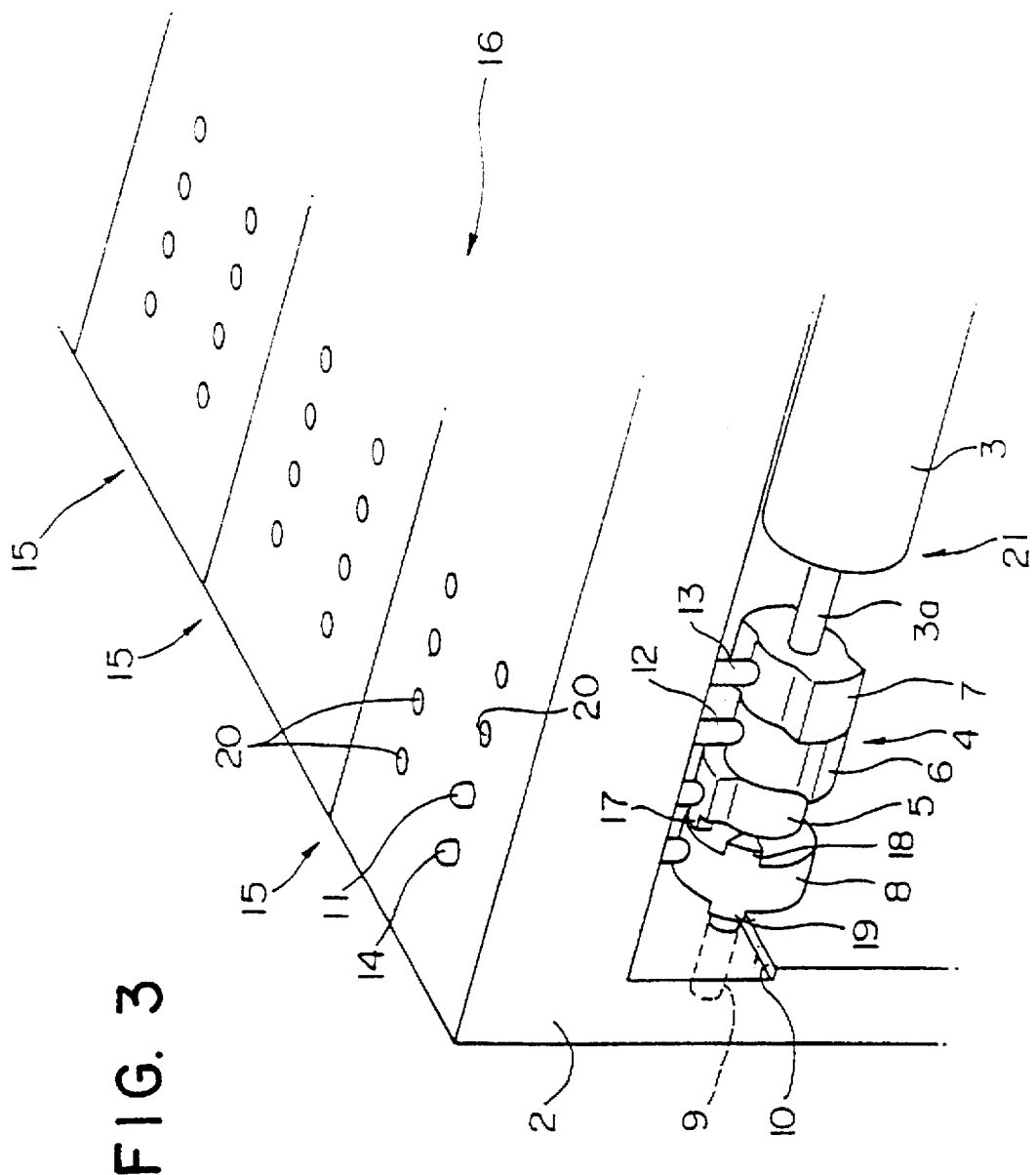
FIG. 3 is a schematic perspective view of a braille display apparatus incorporating the binary information display apparatus shown in FIG. 1.

In reference to FIGS. 1 and 2, the binary information display apparatus of this embodiment is designed so as to display four-bit information, and has a plurality of parallel pins (four braille pins used in this case) 11, 12, 13, 14; a supporting member 2 which supports these pins 11, 12, 13, 14 such that these pins are independently slidable in vertical directions; and an actuating mechanism 21 which acts on the lower ends of these pins 11, 12, 13, 14 so as to urge these pins upward; thereby causing independent vertical movements of such pins.

Figure 6:
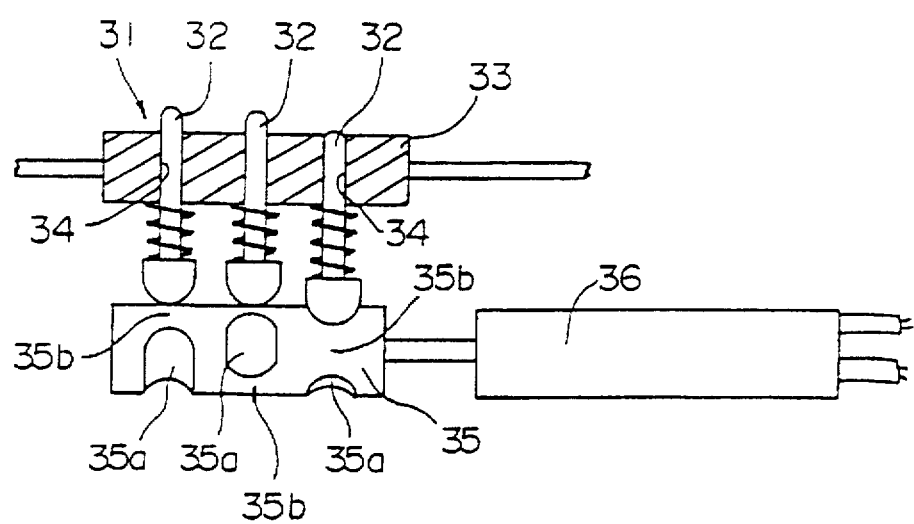
FIG. 6 is a vertical sectional view of a conventional braille display cell.

The supporting member 2 also serves as a casing for mounting a later-mentioned stepping motor 3 which constitutes part of the actuating mechanism 21. Parallel through-bores 20 are formed in this casing so as to open in the ceiling of the casing at a predetermined interval. These through-bores 20 are adapted to receive the aforementioned pins 11, 12, 13, 14, respectively. The through-bores 20 have a diameter slightly greater than that of the pins 11, 12, 13, 14 so that the pins are supported for sliding motion only in the direction of their axes. The structural arrangement may be such that the pins 11, 12, 13, 14 are urged downward by springs, as in the conventional apparatus shown in FIG. 6.

For instance, a four-bit value "1111" is represented when all the pins 11, 12, 13, 14 are projected upward from the display surface 2a presented by the top face of the supporting member 2. Thus, when all these pins are retracted or lowered such that their upper ends are behind the display surface 2a, a four-bit value "0000" is displayed on the display surface 2a.

The actuating mechanism 21 is comprised of the following components: a small-sized stepping motor of about 4 mm diameter; a triplet cam 4, referred to also as the "first rotary cam", connected to the shaft 3a of the stepping motor 3 and having first, second and third cam portions 5, 6, 7; a later-mentioned driving projection 17 integrally formed on one side surface of the first cam portion 5 of the triplet cam 4 so as to project therefrom; and a fourth cam portion 8 (also referred to as "second rotary cam" or "fourth cam") which is rotatably mounted in the supporting member 2 so as to oppose the first cam portion 5 of the triplet cam 4, the fourth cam portion 8 being provided on both sides thereof with a driven projection 18 and a rotation restricting projection 19.

More specifically, the triplet cam 4 fixed to the shaft 3a of the stepping motor 3 has the first cam portion 5, second cam portion 6 and the third cam portion 7 which are adapted for independently actuating the first pin 11, second pin 12 and the third pin 13, respectively. Each of such pins 11, 12 and 13 is selectively movable between a raised position and a lowered position. The cam portions 5, 6 and 7 are so configured as to provide eight (=2³) patterns with regard to the positions of these three pins 11, 12 and 13. In other words, the triplet cam 4 is comprised of the first, second and third cam portions 5, 6 and 7 which are associated with the three pins 11, 12 and 13 out of the four pins 11, 12, 13 and 14, respectively, so as to axially urge the lower ends of the associated pins to independently project and retract the other ends of these pins above and below the display surface 2a of the supporting member 2.

The lower end of each of the pins 11, 12, 13 and 14 is spherical so as to be able to smoothly slide along the concave and convex surface of the associated cam portions; thereby, ensuring efficient and smooth vertical movements of the pins 11, 12, 13 and 14.

A driving projection 17, serving as the driving engaging portion, is provided on a side surface of the first cam portion 5 near the radially outer end of the same so as to project therefrom. A driven projection 18 serving as the driven engaging portion is integrally fixed to one side surface of the fourth cam portion 8 at the same radial position as the driving projection 17. As the triplet cam 4 rotates, the driving projection 17 is brought into contact with the driven projection 18 and, thereafter, the fourth cam portion 8 is rotated together with the triplet cam 4.

The fourth cam portion 8 has an integral supporting shaft (center shaft) 9, which is rotatably carried by the supporting member 2. A rotation restricting projection 19 is integrally projected from the side surface of the fourth cam portion 8 opposite the driven projection 18, at the same radial position as the driven projection 18. A step surface 10, serving as a stopper portion, is provided on a portion of the supporting member 2 above the supporting shaft (central shaft) 9 of the fourth cam portion 8. Consequently, the fourth cam portion 8 is rotatable over an angle (such angle is indicated by Θ in FIG. 2(a)), between a first stop position (shown in FIGS. 2(a) and 4(a)) at which the rotation restricting projection 19 abuts the step surface 10 as a result of clockwise (CW) rotation of the fourth cam portion 8 (as viewed in the direction of the arrow X) and a second stop position shown in FIG. 4(e) at which the rotation restricting projection 19 abuts the step surface 10 as a result of counterclockwise (CCW) rotation of the fourth cam portion 8. Although in the illustrated embodiment the fourth cam portion 8 is fixedly carried by the rotatable supporting shaft 9, the structural arrangement may be such that the fourth cam portion 8 is rotatably carried by a supporting shaft which is fixed on the supporting member 2.

The fourth cam portion 8 has such a cam contour that the fourth pin 14 projects from the display surface 2a when the fourth cam portion 8 has reached the first stop position after clockwise operation of the stepping motor 3, and that the fourth pin 14 is retracted from the display surface 2a when the fourth cam portion 8 has reached the second stop position after counterclockwise rotation CCW of the stepping motor 3.

By way of an example, a description will now be provided for the operation of the binary information display apparatus having the above-described structural arrangement.

Table 1 shows a braille sequence explaining the status of the pins 11, 12, 13, 14 as obtained when the triplet cam 4 is rotated by the stepping motor 3, in relation to the direction of rotation operation of the stepping motor 3, together with supplementary explanations. FIG. 5 is a flow chart showing the process of controlling the stepping motor 3.

TABLE 1

| | Pin No. | | | | Motor | |
| --- | --- | --- | --- | --- | --- | --- |
| | 14<br>4th cam | 13 | 12 | 11 | operating<br>direction | Remarks |
| | | Triplet cam | | | | |
| | · | · | · | · | | |
| | · | · | · | · | | |
| | · | · | · | · | CCW | |
| Intended 8 | 0 | 0 | 0 | 0 | | 4th cam at 2nd stop position |
| brailles | 0 | 1 | 0 | 0 | CW | Motor starts to reverse. |
| displayed | 0 | 0 | 0 | 1 | CW | Thereafter operates CW. |
| | 0 | 1 | 1 | 1 | CW | 4th cam remains stopped. |
| | 0 | 1 | 1 | 0 | CW | |

TABLE 1-continued

| | Pin No. | | | | Motor | |
| | 14 4th cam | 13 | 12 | 11 | operating direction | Remarks |
| | | Triplet cam | | | | |
|---|---|---|---|---|---|---|
| | 0 | 0 | 1 | 0 | CW | |
| | 0 | 0 | 1 | 1 | CW | |
| | 0 | 0 | 0 | 1 | CW | |
| Displayed | 1 | 0 | 0 | 0 | CW | 4th cam starts to rotate |
| though not intended | 1 | 1 | 0 | 0 | CW | |
| | | | | | CW | |
| Intended 8 | 1 | 1 | 0 | 1 | CCW | 4th cam at 1st stop position |
| brailles | 1 | 1 | 0 | 0 | CCW | Motor starts to reverse. |
| displayed | 1 | 0 | 0 | 0 | CCW | Thereafter operates CW. |
| | 1 | 0 | 0 | 1 | CCW | 4th cam remains stopped. |
| | 1 | 0 | 1 | 1 | CCW | |
| | 1 | 0 | 1 | 0 | CCW | |
| | 1 | 1 | 1 | 0 | CCW | |
| | 1 | 1 | 1 | 1 | | |
| Displayed | 1 | 1 | 0 | 1 | CCW | 4th cam starts to rotate. |
| though not intended | 1 | 1 | 0 | 0 | CCW | |
| | 0 | 0 | 0 | 0 | | |
| | . | . | . | . | CCW | |
| | . | . | . | . | | 4th cam at 2nd stop positon |
| | . | . | . | . | | Operation repeated |

Figure 4A:
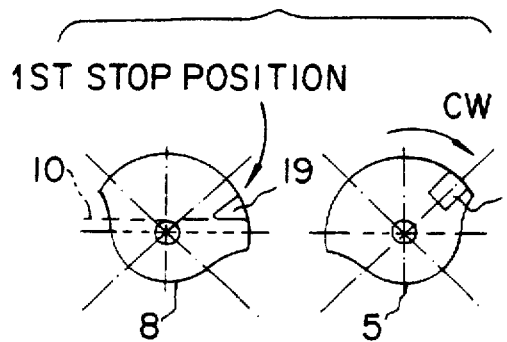
FIGS. 4(a) to 4(i), in combination, illustrate the positional relationship between the first cam portion and the fourth cam portion.

In reference to FIG. 5, braille display instruction is received from a control unit (not shown) in Step S1. In Step S2, when the binary information to be indicated by the fourth pin 14 is "1" (projected), the process proceeds to Step S3 in which the stepping motor 3 operates clockwise as shown in FIG. 4(a) so that the fourth cam portion 8 is brought to the first stop position. In such state, four-bit binary information of "1011" is displayed by the pins 11, 12, 13 and 14.

Figure 4D:
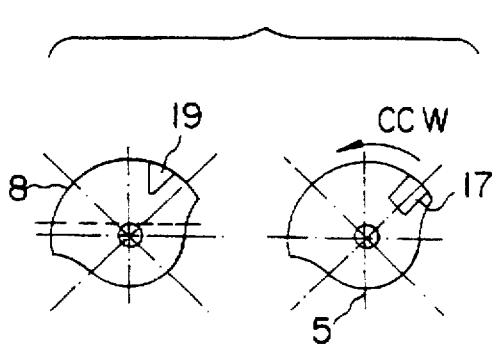
Figure 4B:
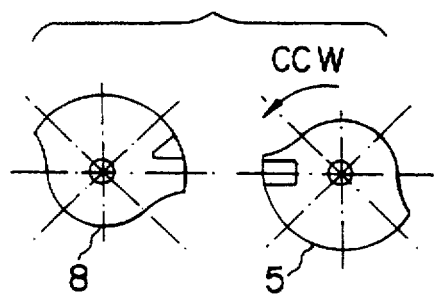

The process then advances to Step S4 in which the stepping motor 3 steps in a counterclockwise direction or operation at an angular increment of 45°, as shown in FIG. 4(b), so that three pins 11, 12, 13 are selectively and independently actuated up and down. In the meantime, the fourth cam portion 8 remains at the first stop position so that the fourth pin 14 is left in the projected state.

Thus, consecutive seven counterclockwise steps at 45° increments performed by the stepping motor 3, starting from the state in which the fourth cam 8 is set to the first stop position, does not cause rotation of the fourth cam portion 8 so that the status of the fourth pin 14 (i.e., a projected state in this embodiment) is not changed during these seven counterclockwise steppings of the stepping motor 3. It is therefore possible to display eight patterns of information expressed by "1011", "0011", "0001", "1001", "1101", "0101", "0111" and "1111", out of the sixteen patterns which are available from the combination of the states of four braille pins 11, 12, 13 and 14, as will be seen from Table 1.

Figure 4E:
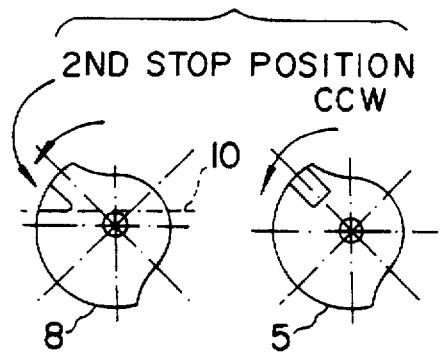
Figure 4C:
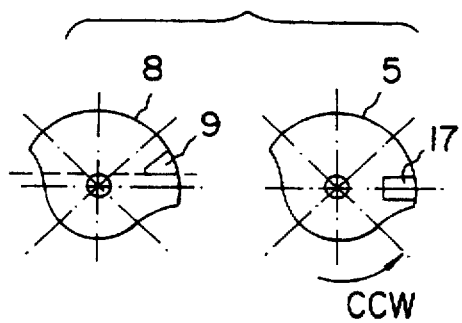
Figure 4F:
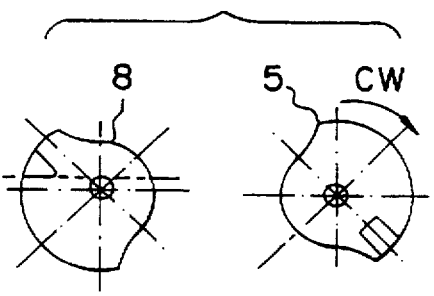

A further counterclockwise operation of the stepping motor 3 brings the driving projection 17 of the first cam portion 5 into contact with the driven projection 18 of the fourth cam portion 8, as shown in FIG. 4(c). Thereafter, as shown in FIG. 4(d), the fourth cam portion 8 is caused to rotate together with the triplet cam 4 to reach the second stop position, as shown in FIG. 4(e). In this state, the fourth pin 14 is held in the retracted position; thereby, indicating a binary value "0".

For information, initialization or one stepping motor 3 is possible by causing this motor 3 to perform several counterclockwise steps from the state shown in FIG. 4(e). Such counterclockwise stepping of the stepping motor 3 brings the driving projection 17 of the triplet cam 4 into contact with the driven projection 18 of the fourth cam portion 8 which has been fixed against counterclockwise rotation, wherein the triplet cam 4 and, hence, the motor shaft 3a fixed to the triplet cam 4 is fixed against further counterclockwise rotation. When further driving voltage pulses are applied to the stepping motor 3 under such a condition, the stepping motor 3 is forced out of the phase so as to be initialized to the original position. Consequently, the stepping motor 3 is reset to the original position without aid of any sensing or detecting means. It is therefore possible to obtain an inexpensive binary information display apparatus which is simple in construction and small in size.

In reference again to Step S2 of the flow chart shown in FIG. 5, when the binary information to be indicated by the fourth pin 14 is "0" (retracted), the process proceeds to Step S5 in which the stepping motor 3 operates counterclockwise as shown in FIG. 4(e) so that the fourth cam portion 8 is brought to the second stop position. In this state, four-bit binary information of "0000" is displayed by the pins 11, 12, 13 and 14.

The process then advances to Step S6 in which the stepping motor 3 steps in the clockwise direction so that three pins 11, 12 and 13 are selectively and independently actuated up and down. In the meantime, the fourth cam portion 8 remains at the second stop position so that the fourth pin 14 is left in the retracted state.

Thus, consecutive seven clockwise steps at 45° increments performed by the stepping motor 3, starting from the state in which the fourth cam portion 8 is set to the second stop position, does not cause rotation of the fourth cam portion 8 so that the status of the fourth pin 14 (i.e., retracted state in this embodiment) is not changed during such seven clockwise steppings of the stepping motor 3. It is therefore possible to display another eight patterns of information expressed by "0000", "0010", "1010", "1110", "0110", "0100", "1100" and "1000", out of the sixteen patterns which are available from the combination of the states of four braille pins 11, 12, 13 and 14, as will be seen from Table 1.

Figure 4G:
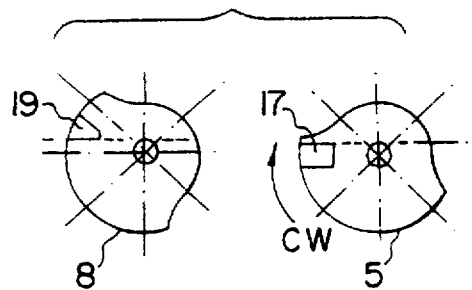
Figure 4H:
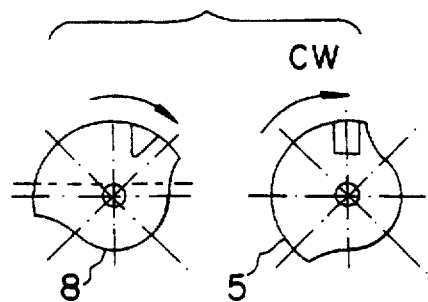
Figure 4I:
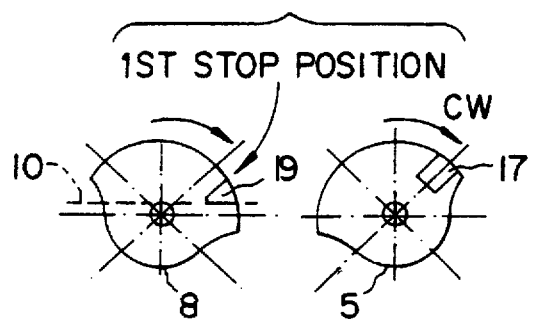

A further clockwise operation of the stepping motor 3 brings the driving projection 17 of the first cam portion 5 into contact with the driven projection 18 of the fourth cam portion 8, as shown in FIG. 4(g). Thereafter, as shown in FIG. 4(h), the fourth cam portion 8 is caused to rotate together with the triplet cam 4 in order to reach the first stop position, as shown in FIG. 4(i). In this state, the fourth pin 14 is held in the projected position; thus, indicating binary value "1".

For information, initialization of the stepping motor 3 is possible by causing this motor 3 to perform several clockwise steps from the state shown in FIG. 4(i). Such clockwise stepping of the stepping motor 3 brings the driving projection 17 of the triplet cam 4 into contact with the driven projection 18 of the fourth cam portion 8 which has been fixed against a clockwise rotation, wherein the triplet cam 4 and, hence, the motor shaft 3a fixed to the triplet cam 4 is fixed against further clockwise rotation. When further driving voltage pulses are applied to the stepping motor 3 under such a condition, the stepping motor 3 is forced out of the phase so as to be initialized to the original position.

As will be understood from the foregoing description, in the described embodiments of the present invention, it is possible to obtain a binary information display apparatus which employs four pins 11, 12, 13 and 14, wherein eight patterns of information, which is half of four-bit information, can be produced by seven consecutive steps of the stepping motor 3 in one direction at 45° increments, and another eight patterns of information, which is the remainder of the four-bit information, can be produced by seven consecutive steps of the stepping motor 3 in the other direction at 45° increments, wherein sixteen patterns of information, in total, are obtainable through forward and backward operations of the stepping motor.

According to the above-described structural arrangement, the resistance load imposed on the cam when lifting the braille pin is reduced in comparison to the conventional apparatus in which four cam portions are integrated to require smaller angular increments of stepping, and consequently, a greater gradient of the slope of the cam contour. The load imposed on the stepping motor 3 is also correspondingly decreased so that the tendency for the stepping motor to get out of the phase is reduced; and the accuracy of display of braille information is improved.

In addition, the described embodiments do not require reduction of the diameter of the pins contacting the cam so that the pins can have strength large enough to sustain the manual force exerted by the fingers of the users. Consequently, the reliability of the braille display apparatus, as a commercial product, is also improved.

In the above-described embodiment, the resolution or step angle of the stepping motor is set to 45° in order that sixteen patterns of information are displayed. This, however, is not exclusive and the step angle of the stepping motor may be determined in accordance with the number of patterns of information.

Furthermore, although the binary information display apparatus of the above-described embodiment is designed in order to display sixteen patterns of information by means of four pins, this is not exclusive and the invention may be carried out in a different form. For instance, the invention may be carried out so as to display sixteen patterns of information by using a suitable number of pins (e.g., 6 pins). Thus, what is required by the present invention is that an end pin which is on one end of the array of the pins is solely not directly driven by the rotary cam which is fixed to the shaft of the motor.

FIG. 3 is a schematic perspective view of a braille display apparatus incorporating the binary information display apparatus of the above-described embodiment. In this braille display apparatus, denoted by 16, a pair of binary information display apparatus 1, each having the structural arrangement, illustrated in FIG. 1, are arranged side-by-side so as to form a module 15. The braille display apparatus 16 employs such a module 15, alone, or employs a plurality of such modules 15 to form a matrix of pins. Each triplet cam 4 in each module is rotated stepwise at 45° increments so as to have eight step positions. The eight pins of each module 15 are selectively and independently movable up and down so that 128 patterns of information are obtainable in accordance with the states of eight pins of the module 15. The display surface can be touched by the fingers of users (such as persons whose eyes are handicapped) so that the users can read characters (such as, numerals or letters) which are displayed in the same way as those in conventional braille display systems (such as, systems using punch cards or relief plates).

As will be understood from the foregoing description, the present invention offers the following advantages.

First, according to the principal characteristic features of the present invention, the end pin which is at one end of the array of pins is not directly driven by the rotary cam which is directly connected to the motor shaft. Therefore, the gradient of the slope of the cam contour can be reduced as compared to the case where all the pins are actuated by an integral rotary cam. This significantly reduces the resistance load exerted on the cam when lifting the pins. The load applied to the motor also is correspondingly reduced so that the risk for the motor to get out of the phase is reduced; thereby, improving the accuracy of the braille display.

In addition, it is not necessary to reduce the diameter of the pins contacting the cam, as compared to the conventional apparatus, so that the mechanical strength of the pins is not decreased. Consequently, the reliability of the braille display, as a commercial product, is also improved.

The binary information display apparatus of the invention, when constructed such that the motor is rotated stepwise at a 45° increment, can display sixteen patterns of information by using four pins.

Furthermore, when a stepping motor is used as the driving motor, it is possible to easily initialize the state of the apparatus without requiring specific means (such as, an encoder for detecting rotational position). It is thus possible to obtain a small-sized binary information display apparatus having a simple, and a high degree of precision of construction.

While the invention has been particularly shown and described in reference to preferred embodiments thereof, it will be understood by those skilled in the art that changes in form and details may be made therein without departing from the spirit and scope of the invention.

What is claimed is:

1. A binary information display apparatus, comprising:
   an array of a plurality of pins which are arrayed at a constant pitch in parallel with one another;
   a supporting member for supporting said pins such that said pins are independently and linearly movable along axes thereof;
   a first rotary cam engaging with ends of the pins of a group exclusive of an end pin which is at an end of said array so as to axially urge said pins of said group such that said pins are independently actuated by said first rotary cam resulting in other ends of the independent pins of said group to selectively project from and retract behind a display surface of said supporting member;

a motor for supporting said first rotary cam and for rotating said first cam around an axis thereof;

a second rotary cam for actuating said end pin, said second rotary cam being rotatably mounted to oppose said first rotary cam;

a driving engaging portion provided on a side surface of said first rotary cam opposing said second rotary cam;

a driven engaging portion provided on one side surface of said second rotary cam so as to be engaged by said driving engaging portion in accordance with the rotation of said first rotary cam to thereby rotate said second rotary cam; and a rotation restricting projection provided on the other side surface of said second rotary cam, said rotation restricting projection being engageable with a stopper portion of said supporting member so as to hold said second rotary cam at one of a first stop position and a second stop position, wherein the cam contour of said second rotary cam is such that said end pin projects from said display surface when said second rotary cam has been rotated to one of said stop positions as a result of the rotation of the shaft of said motor in one direction, and that said end pin is retracted from said display surface when said second rotary cam has been rotated to the other stop position as a result of the rotation of the shaft of said motor in the other direction.

2. A binary information display apparatus according to claim 1, wherein said plurality of pins include four pins, and wherein said motor holds said first rotary cam at one of eight step positions which are arranged at 45° intervals.

3. A binary information display apparatus according to claim 1 or 2, wherein said motor is a stepping motor.

* * * * *